United States Patent
Hernacki

(10) Patent No.: US 7,908,657 B1
(45) Date of Patent: Mar. 15, 2011

(54) DETECTING VARIANTS OF KNOWN THREATS

(75) Inventor: Brian Hernacki, San Carlos, CA (US)

(73) Assignee: Symantec Corporation, Mountain View, CA (US)

( * ) Notice: Subject to any disclaimer, the term of this patent is extended or adjusted under 35 U.S.C. 154(b) by 1030 days.

(21) Appl. No.: 11/240,789

(22) Filed: Sep. 29, 2005

(51) Int. Cl.
*G06F 11/34* (2006.01)
(52) U.S. Cl. .................. 726/23; 726/24; 714/2; 714/33; 713/151; 713/188
(58) Field of Classification Search .................... 726/24; 714/2, 33, 38; 713/151, 188
See application file for complete search history.

(56) References Cited

U.S. PATENT DOCUMENTS

| | | | | |
|---|---|---|---|---|
| 5,359,659 | A | * | 10/1994 | Rosenthal ........................ 726/24 |
| 5,581,664 | A | * | 12/1996 | Allen et al. ...................... 706/46 |
| 2002/0199095 | A1 | * | 12/2002 | Bandini et al. ................. 713/151 |
| 2004/0117648 | A1 | * | 6/2004 | Kissel ............................ 713/200 |

OTHER PUBLICATIONS

Xu et al. "Polymorphic Malicious Executable Scanner by API Sequence Analysis." Presented and published at the Fourth International Conference on Hybrid Intelligence Systems, Dec. 5-9, 2004. ISBN 0-7695-2291-2.*

* cited by examiner

*Primary Examiner* — Vivek Srivastava
*Assistant Examiner* — Kevin Richards
(74) *Attorney, Agent, or Firm* — Hunton & Williams LLP

(57) ABSTRACT

Detecting a variant of a known threat is disclosed. A portion of network traffic is matched with at least a portion of a signature associated with the known threat. If the portion of network traffic being matched with the signature does not exactly match the signature, the extent of match between the portion of network traffic and the signature is determined. If the extent of match satisfies a threshold, a security response is triggered based upon the extent of match.

20 Claims, 5 Drawing Sheets

GET/ABC/XYZ/FOO.CGI?USER=XXXXXX

GET/.*/FOO.CGI?USER=[A-Z]{6,}
506  508                510

GET/ABC/DEF/FOO.CGI?USER=YYYYYY
                          514

HEAD/ABC/FOO.CGI?USER=22222222
 518      520            522

GET/XYZ/FOO.CGI?ACTION=LIST
      526          528

DETECTING VARIANTS OF KNOWN THREATS

BACKGROUND OF THE INVENTION

A network security system typically employs techniques to detect and prevent threats and attacks from infiltrating a secured network. In some cases, signatures or patterns of known vulnerabilities and exploits are used to detect threats present in network traffic. Network traffic is matched against a set of signatures associated with known threats, and if it is determined that a portion of the traffic matches such a signature, an appropriate action is taken, such as the blocking of the affected traffic, issuance of an alert to an administrator, etc. Signatures may correspond to vulnerabilities or specific exploits targeting a vulnerability. In either case, foreknowledge of a vulnerability or exploit is needed to author a corresponding signature. For this reason, matching network traffic against a set of signatures corresponding to known threats works well for detecting future attempts to use exploits seen at least once before. However, signature matching often fails in detecting new vulnerabilities and exploits, such as variations of existing vulnerabilities and exploits.

A variation or a mutation of a known attack can cause a pattern or signature corresponding to the known attack to fail to match the variation, and yet the variation may still be an effective attack. The latest threats are frequently variants of existing threats. Several approaches are currently employed to detect threats for which a signature that would detect the threat does not currently exist, but these techniques are not always effective or efficient ways to detect variants of known threats. In one approach, vulnerability signatures are used instead of specific exploit signatures. Vulnerability signatures are more general and consequently less vulnerable to variations. However, due to their generic nature, vulnerability signatures are more expensive and difficult to implement, for example, in terms of processing requirements and resulting costs. Moreover, since it is often not possible to predict how an attacker will permute or vary existing threats, it is difficult to author vulnerability signatures that encompass all possible variants but still avoid generating excessive false positives. In another approach to detecting variants and other previously unknown threats, anomaly detection techniques—such as noting deviations from past traffic patterns for a particular host, pair of hosts, protocol, port, etc.—are used; however, such techniques consume a lot of processing resources and often result in excessive false positives and false negatives. While new signatures typically are written to cover variants and other previously unknown threats once they have been observed, such an approach leaves a protected network vulnerable to attacks until the signature set is updated, by which time the variant may already have been used to compromise a host associated with the network.

Thus, there is a need for a more effective way to detect variants of known threats.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Detecting a variant of a known threat is disclosed. A portion of network traffic is matched with at least a portion of a signature associated with the known threat. If the portion of network traffic being matched with the signature does not exactly match the signature, the extent of match between the portion of network traffic and the signature is determined. If the extent of match satisfies a threshold, a security response is triggered based upon the extent of match.

Figure 1:
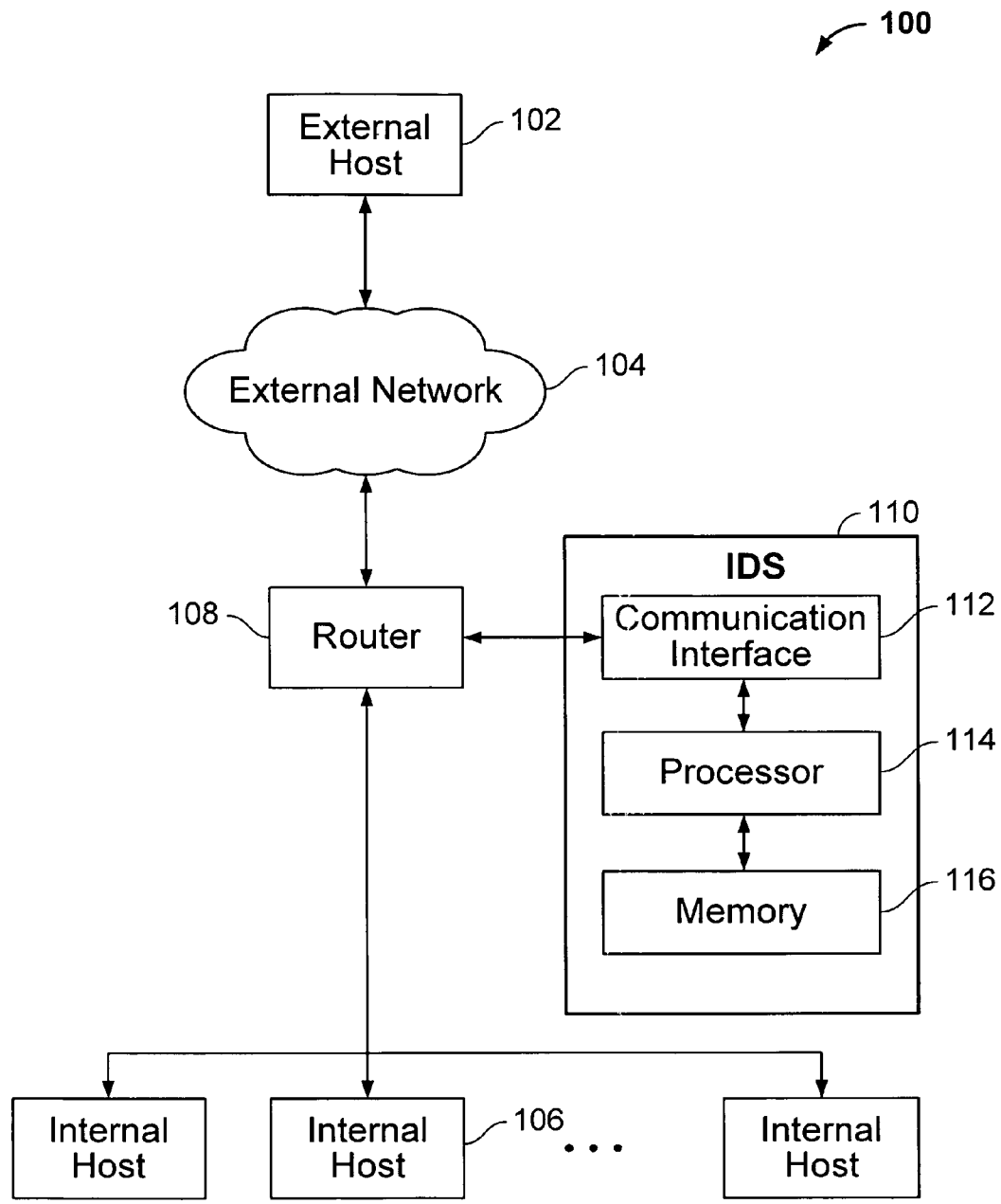
FIG. 1 illustrates an embodiment of a network environment in which an intrusion detection system is configured to monitor and detect threats.

FIG. 1 illustrates an embodiment of a network environment in which an intrusion detection system is configured to monitor and detect threats. In the example shown, network environment 100 includes an external host 102 connected to an external network 104. A secured network including a plurality of internal hosts, such as internal host 106, is connected to external network 104 via a router 108. In the example shown, the boundary of the secured network is defined by router 108. In some embodiments, router 108 includes a firewall. Router 108 is coupled to an intrusion detection system, IDS 110. In some embodiments, IDS 110 is configured to match network traffic passing into the secured network against a set of signatures of known vulnerabilities and exploits. In the given example, IDS 110 includes a communication interface 112 for communicating with router 108, for example, to receive data packets from the router; a processor 114 for processing data received via communication interface 112; and a memory 116 for providing instructions to processor 114 and for saving relevant data. Alternatively, an intrusion prevention system (IPS), a firewall, a specialized external device, or some other gateway device may be used instead of or in addition to IDS 110 to detect threats against internal network assets in the secured network environment and/or such functionality may be deployed directly at an internal network node, such as host 106.

A signature set comprised of signatures expressed, for example, using regular expressions may be employed to perform pattern matching. If the pattern matching simply comprises searching for an exact match to a signature as is typically done, once any part of a given signature fails to match, further matching using that signature is ceased. Since in some cases a single byte difference can result in a failed match, simply searching for an exact match tends to create a binary case of "match" or "no match" and may fail to detect, for example, variants of threats. Detecting variants of known threats by determining the extent to which a given portion of network traffic or a network flow matches a signature or portion thereof is disclosed herein. In some embodiments, a security response, e.g., an alert or other responsive action, is taken if the degree of mismatch, which can be thought of as the "distance" between the observed traffic and the signature, is less than a prescribed threshold.

In some embodiments, network traffic is matched against each signature in a set of signatures corresponding to known vulnerabilities and exploits, and matching is continued even after a mismatch is encountered between a network flow and a given signature. In some embodiments, after a mismatch is encountered, matching continues until a mismatch threshold is reached. In some embodiments, as a network flow is matched with a signature, a mismatch score or distance is computed for each mismatch and added to a running sum of mismatch scores that quantifies the divergence between the signature and the network flow or portion of the network flow being matched with the signature. In some embodiments, a mismatch score operates like a Hamming distance. In some embodiments, the cause and nature of a mismatch dictates the manner in which a corresponding mismatch score is computed.

In some embodiments, each literal byte of mismatch adds some constant to the running sum. In some embodiments, a constant is added to the running sum for each byte that is included in a portion of the network traffic that corresponds to but does not match a special operator included in the signature such as a wildcard, span, etc. In some embodiments, the same constant value is added in the event of a mismatch with respect to a special operator, regardless of the number of corresponding bytes in the observed traffic. In some embodiments, the constants associated with one or more literal bytes of mismatch and/or operators may be weighted by multipliers. In some embodiments, the weight assigned is determined in at least some cases by the nature of the mismatch. Rather than simply assigning a constant per byte of mismatch, a value is assigned based at least in part on the nature of the expected bytes relative to the nature of the actual bytes. For example, if alphanumeric data is expected but non-alphanumeric data is received, this may mean greater divergence than simply a mismatching alphanumeric byte, and different weights are assigned accordingly. The exact weights and/or the formulas used to derive the weights are in some embodiments determined at least in part experimentally. In some embodiments, different mismatch weights are assigned to the various command words, literals, operators, and combinations thereof that define the pattern matching language used to implement the signatures.

In some embodiments, a mismatch score is computed as each byte of mismatch is detected. In some embodiments, the mismatch score is weighted, with the mismatch of certain bytes being accorded a greater or lesser weight than other mismatched bytes. In various embodiments, the weights are assigned based on the nature or extent of the mismatch and/or the corresponding portion of the signature. In some cases, a related group of mismatching bytes are detected, and a weighted mismatch score is computed for the entire group of bytes. Each mismatch score is added to a running sum of mismatch scores. The running sum is an example of a heuristic for gauging the degree of similarity or proximity between a network flow and a signature. Such a heuristic may be employed by a local security policy to establish one or more reaction thresholds that dictate reactions to traffic that is similar to but not the same as a known threat. For example, if the running sum of mismatch scores is low (i.e. only a small portion of a network flow mismatched a signature, that is, a close match exists), the associated network traffic may be blocked; for higher running sums, an alert may be generated to an administrator; and yet for higher running sums, the associated network traffic may be logged for future analysis if it is later determined to result in a breach in network security. In some embodiments, once the running sum has crossed an upper mismatch threshold that signifies a complete mismatch or at least a sufficiently large degree of mismatch that the traffic is unlikely to be a variant of the known exploit with which the signature is associated, further matching with the given signature is ceased, for example, for performance reasons. The mismatch threshold provides a metric to stop matching with a given signature and may be signature and/or policy dependent. In some embodiments, pattern matching ceases if the end of a signature or network flow is reached; however, the running sum of mismatch scores or some other metric, such as one comparing the degree of match with the degree of mismatch, may still satisfy one or more reaction thresholds and an appropriate action may be necessary. By providing a way to judge how similar a given portion of traffic is to a known threat rather than simply looking for an exact match to a signature associated with the threat, it is possible to return a value from a range (e.g., 0 to $\infty$, where 0 is an exact match) rather than just a binary value (e.g., 0 or 1) when performing pattern matching. Since signature authoring can not be perfect and can not predict all variants, it is useful to know how close of a match network traffic is to a signature. By measuring the proximity of a match, an appropriate action can be performed if a near match exists and new variants of existing threats can be identified.

In some embodiments, one or more heuristics or metrics may be applied to the running sum of mismatch scores at any point during matching to produce a value associated with proximity, sometimes referred to herein as a "proximity score", that is compared with one or more reaction thresholds. In some embodiments, the running sum of mismatch scores is the proximity score. In some embodiments, after a relevant portion of network traffic is matched against a portion of or the entire length of a signature, a ratio may be computed based on the number of bytes that matched and the number of bytes that mismatched to determine the proximity of the network traffic with the signature, and appropriate reaction thresholds may be employed to determine whether any action is necessary. Any appropriate means for computing such a proximity score may be employed to measure proximity.

Figure 2:
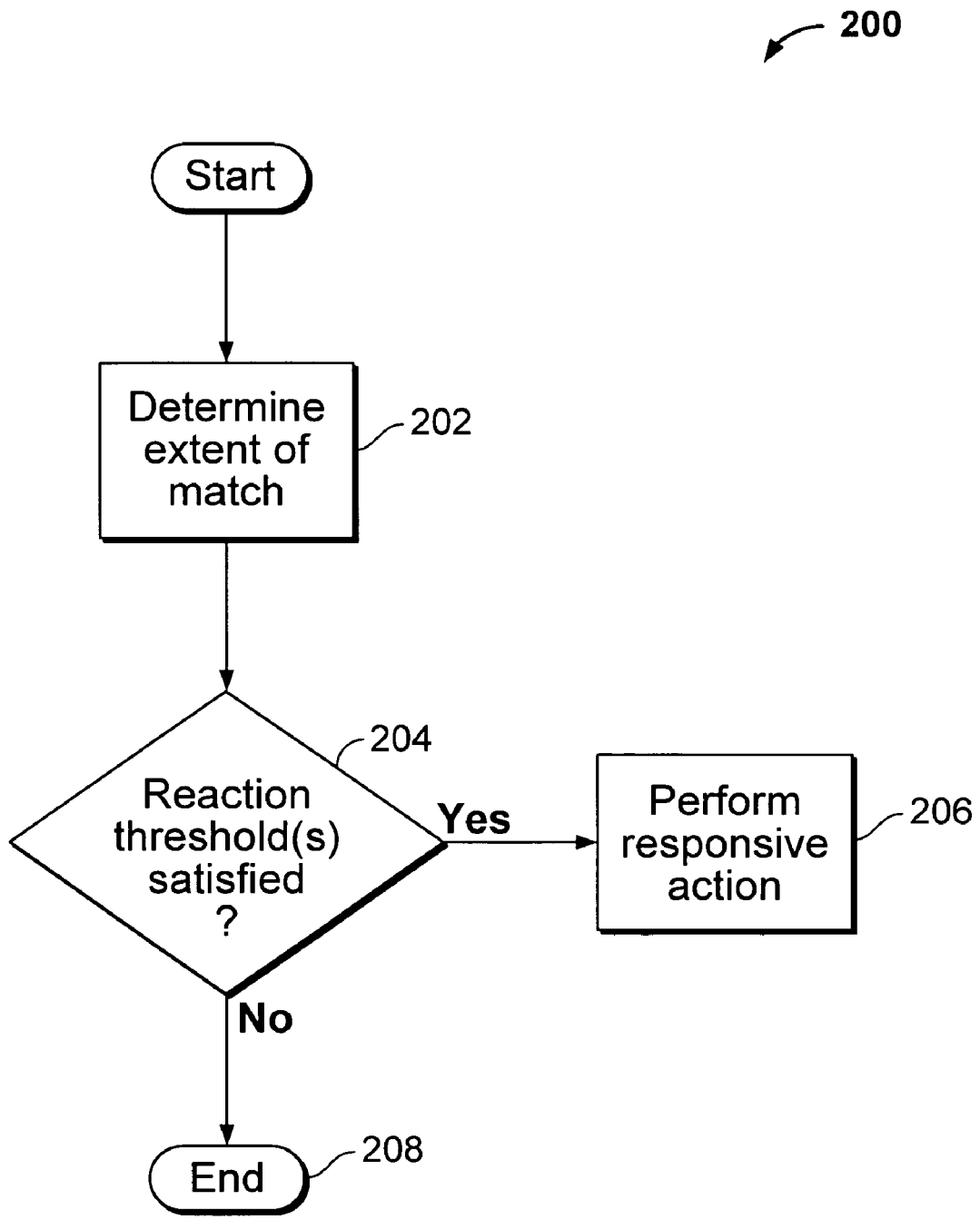
FIG. 2 illustrates an embodiment of a process for matching a portion of network traffic against a signature associated with a known threat.

FIG. 2 illustrates an embodiment of a process for matching a portion of network traffic against a signature associated with a known threat. In the example shown, process 200 begins at 202 at which the extent of match is determined. In some embodiments, the extent of mismatch is determined at 202. In some embodiments, the extent of match is determined on a continuing basis. For example, the percentage of match and/or mismatch may be tracked as matching proceeds between a network flow and a signature. In some embodiments, the extent of match is based at least in part on the number of bytes that match and/or mismatch. In some embodiments, a signature is parsed into segments, and the extent of match is based at least in part on the number of corresponding segments that match and/or mismatch. In some embodiments, the manner of determining the extent of match is signature dependent. In some embodiments, the extent of match is determined at 202 once the entire signature has been compared to corresponding portions of the network traffic being monitored. In some embodiments, a sufficient partial match may be determined to exist prior to the entire signature being processed. At 204 it is determined whether the extent of match determined at 202 satisfies a reaction threshold. In some embodiments, the extent of mismatch is compared with a corresponding reaction threshold at 204. In some embodiments, the extent of match is compared with a plurality of reaction thresholds, each having a different responsive action associated with it. In some embodiments, the extent of match is determined on a rolling or continuous basis, as portions of network traffic are received and matched against corresponding parts of the signature, and an iteration of 202 and 204 is performed for each portion of network traffic that is processed. If it is determined that the extent of match satisfies a reaction threshold, i.e. if it is determined that a close enough match exists, at least one responsive action is performed at 206. The responsive action performed at 206 may be a function of the extent of match. For example, the associated network traffic may be blocked, an alert may be issued to an administrator, the associated network traffic may be logged, etc., at 206 depending on the local security policy and the reaction thresholds set by the local security policy. If it is determined at 204 that the extent of match does not satisfy a reaction threshold, i.e. if it is determined that a close enough match to warrant any responsive action does not exist, then no responsive action is taken and process 200 ends at 208.

Figure 3:
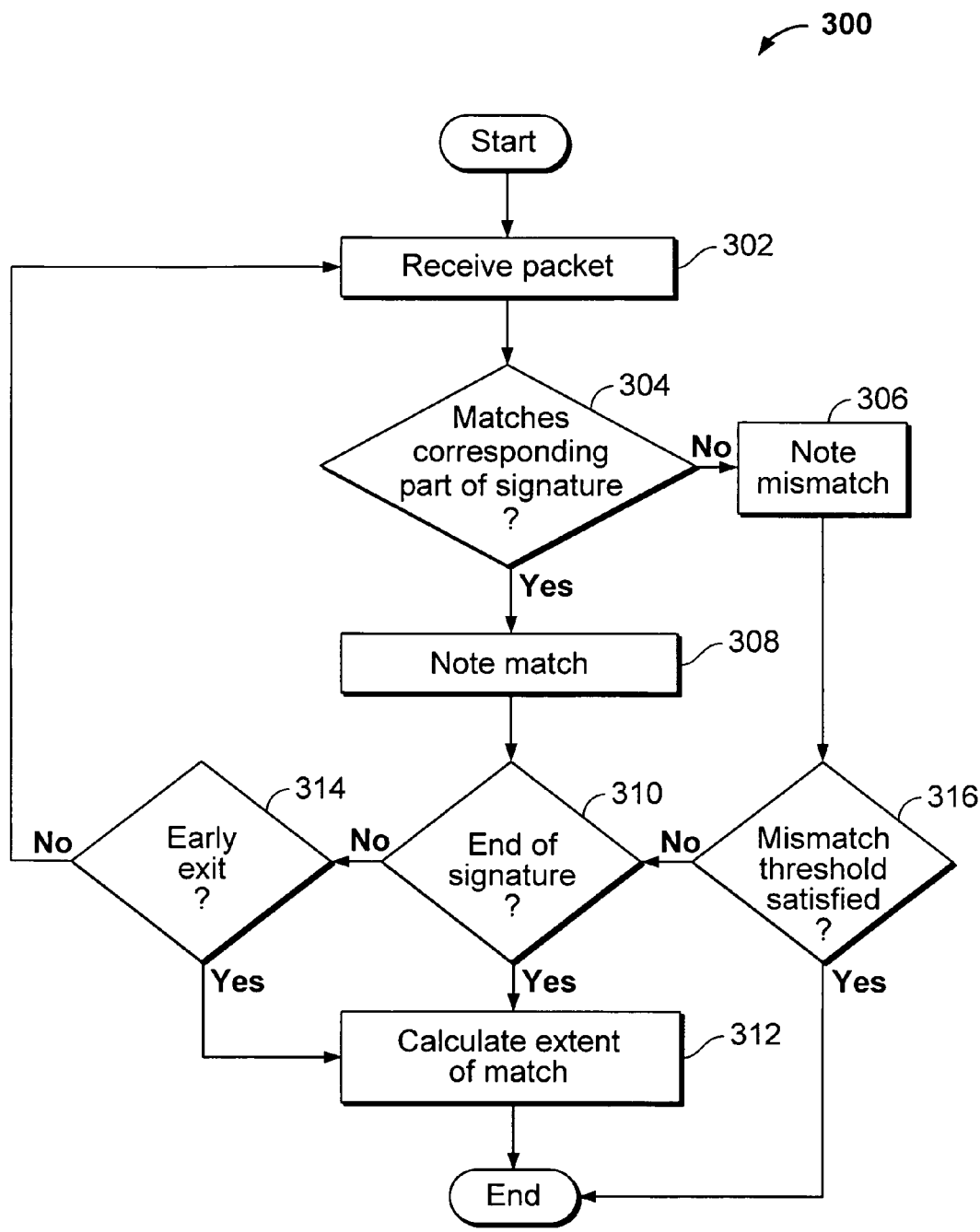
FIG. 3 illustrates an embodiment of a process for determining the extent of match between a portion of network traffic and a signature against which it is being matched.

FIG. 3 illustrates an embodiment of a process for determining the extent of match between a portion of network traffic and a signature against which it is being matched. In some embodiments, process 300 is employed at 202 of process 200 in FIG. 2. At 302 a packet (or other discrete portion) of network traffic is received. At 304 it is determined whether the packet received at 302 matches the corresponding part of the signature. If it is determined at 304 that the packet received at 302 does not match the corresponding part of the signature, the mismatch is noted at 306. In some embodiments, a mismatch score is computed and added to a running mismatch score at 306. In some embodiments, the mismatch score is appropriately weighted by a multiplier that corresponds to the nature of the mismatch. If it is determined at 304 that the packet received at 302 matches the corresponding part of the signature, the match is noted at 308. In some embodiments, a match score is computed and added to a running match score at 308. In some embodiments, the match score is appropriately weighted by a multiplier that corresponds to the nature of the match. It is determined at 310 whether the end of the signature has been reached. If it is determined at 310 that the end of the signature has been reached, the extent of match is calculated at 312. If it is determined at 310 that the end of the signature had not been reached, it is determined at 314 whether to exit the matching process early. In some embodiments, it is desirable to exit the matching process early if a match or mismatch can be deduced without continuing to match the entire signature. In some embodiments, the matching process is exited early at 314 if one or more critical portions of the signature, or a prescribed number of bytes, have been matched. In some embodiments, the matching process is exited early at 314 if one or more critical portions of the signature, or a prescribed number of bytes, have not been matched. If it is determined at 314 to exit the matching processes early, at least the extent of match of the portion of the signature that was matched against the network traffic is calculated at 312. If it is determined at 314 not to exit the matching process early, process 300 continues with 302 where the next packet is received.

In the example shown in FIG. 3, at 316 it is determined whether a mismatch threshold has been satisfied. In some embodiments, if enough mismatches have occurred, it is desirable to stop continuing matching for performance reasons. Specifically, it is determined at 316 whether at least one mismatch criterion or threshold has been satisfied. The mismatch threshold may be signature and/or policy dependent. The mismatch threshold may be based at least in part upon one or more of the number of bytes of mismatch, the number of segments of mismatch, the percentage of mismatch, the amount of mismatch relative to the amount of match, etc. In some embodiments, protocol awareness is employed to quantify mismatch and to determine whether to stop matching at 316. In some embodiments, it is determined whether the mismatch threshold is satisfied at 316 for each byte of mismatch. In some embodiments, it is determined whether the mismatch threshold is satisfied at 316 periodically. For example, if protocol parsing is employed, one or more mismatch thresholds may be compared to at 316 whenever a major chunk or segment results in a mismatch. If it is determined at 316 that a mismatch threshold has been satisfied, e.g., if enough mismatches have occurred, further matching is ceased and process 300 ends. However, if it is determined at 316 that a mismatch threshold has not been satisfied, process 300 continues from 310. In some embodiments, 316 is omitted, processing in the event of a mismatch advances from 306 to 310, and early exit on the basis of a mismatch threshold being reached is implemented at 314. In some embodiments in which 316 is included, in the event a mismatch threshold is reached processing advances to 312, in which an extent of match reflecting the degree of mismatch is calculated and returned to the process 200 of FIG. 2 (at 202), in which process 200 the extent of match calculated under such circumstances, i.e. early exit from the process 300 due to high extent of mismatch, would in some embodiments be such that the reaction threshold applied at 204 would not be met.

In some embodiments, one or more match/mismatch scores and/or the running match/mismatch scores are subjected to one or more formulas or heuristics at 312 to calculate the extent of match. The extent of match (or mismatch) calculated at 312 may be in the form of a proximity score. In some embodiments, the extent of match is determined by calculating a ratio of the sum of weights associated with matched bytes divided by the sum of weights associated with mismatched bytes.

Figure 4:
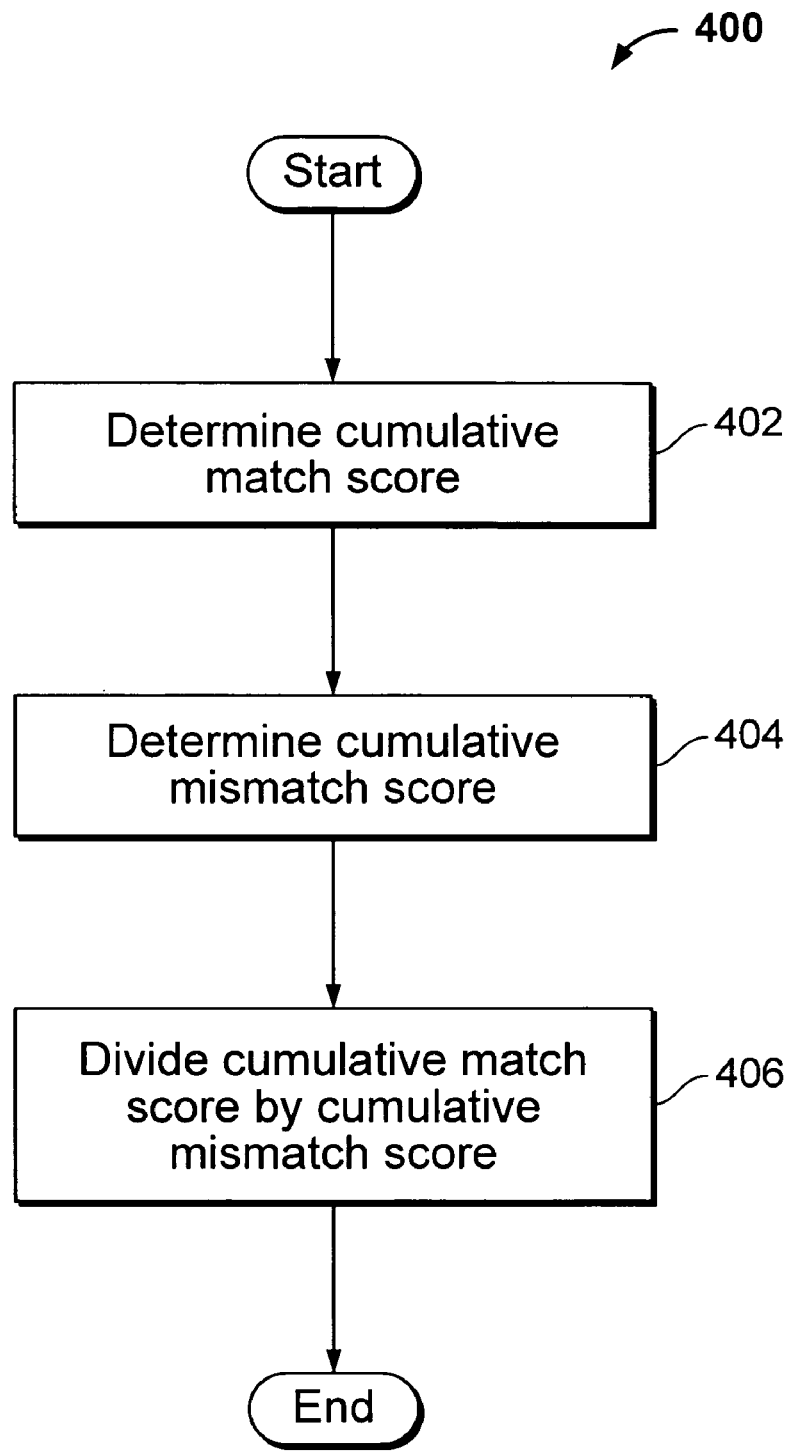
FIG. 4 illustrates an embodiment of a process for calculating the extent of match.

FIG. 4 illustrates an embodiment of a process for calculating the extent of match. In some embodiments, process 400 is employed at 312 of process 300 of FIG. 3. At 402, the cumulative match score is determined. In some embodiments, one or more of the individual match scores and/or a related group of match scores that comprise the cumulative or running match score may be weighted by applicable multipliers that take into account the cause and nature of the corresponding matches. In some embodiments, weights are determined based at least in part on analysis of the signature by one or more persons having knowledge of the signature, the exploit it is designed to detect, and/or the vulnerability with which it is associated. Greater weights are assigned to portions of the signature that would not be likely to occur in non-malicious traffic, for example. In some embodiments, a match for a portion of a signature that requires a specific byte (or byte sequence) to match is weighted more heavily than a match that requires only a value within a specified range, which in turn is weighted more heavily than a match with a portion of a signature that includes one or more "wildcard" operators such that any value would be a match. In some embodiments, weights are determined and/or adjusted based at least in part on manual and/or automated analysis of actual observed behavior. In some embodiments, weights are not assigned to matches and each matched byte is given the same weight. At 404, the cumulative mismatch score is determined. In some embodiments, one or more of the individual mismatch scores and/or a related group of mismatch scores that comprise the cumulative or running mismatch score may be weighted by applicable multipliers that take into account the cause and nature of the corresponding mismatches. At 406, the cumulative match score is divided by the cumulative mismatch score to calculate the extent of match (or mismatch). In some embodiments, the value computed at 406 corresponds to a proximity score. Alternatively, extent of match may be computed using any other suitable metric.

Figure 5A:
FIG. 5A illustrates an example of a known threat.
Figure 5B:
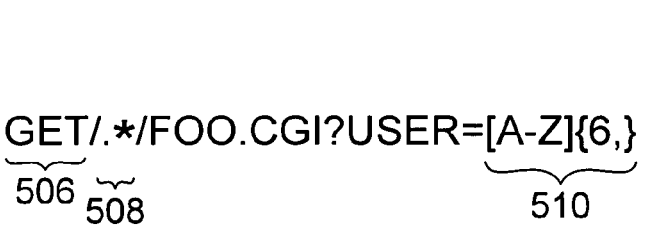
FIG. 5B illustrates an example of a signature that may be used to identify the threat of FIG. 5A via pattern matching.

An example of the manner in which a base signature used to identify a known threat may be authored, the manner in which various types of variants of the known threat may be handled, and the manner in which the proximity of a variant to the signature may be calculated is provided with respect to FIGS. 5A-5E. FIG. 5A illustrates an example of a known threat 502. FIG. 5B illustrates an example of a signature 504 that may be used to identify threat 502 of FIG. 5A via pattern/matching. In the given example, instead of limiting signature 504 to the exact content of known threat 502, a more generic signature 504 is employed in order to provide a better defense against some of the possible variants of known threat 502. However, the generality of signature 504 is constrained by the number of false positives or the amount of over matching that may occur if it is written too broadly. In the example shown, portion 506 of the signature ("GET") is a protocol command word, portion 508 of the signature (".*") is a wild card that is matched by any one or more characters, and portion 510 of the signature ("[A-Z]{6,}") is a character span that is matched if any character of the alphabet ("[A-Z]") is repeated at least six times ("{6,}").

Figure 5C:
FIG. 5C illustrates an example of a variant of the threat of FIG. 5A that can be detected by matching it against the signature of FIG. 5B.

FIG. 5C illustrates an example of a variant 512 of threat 502 that can be detected by matching it against signature 504. Variant 512 differs from threat 502 by portion 514 (i.e. "YYYYYY" instead of "XXXXXX" in threat 502) but matches signature 504 since signature 504 is broad enough to encompass at least this variation of threat 502. A proximity score can be computed for variant 512 with respect to signature 504 and in this case would result in a value that indicates a perfect match.

Figure 5D:
FIG. 5D illustrates an example of a variant of the threat of FIG. 5A that would result in a false negative if only straight signature matching were used but can be detected if the proximity of the variant to the signature of FIG. 5B is computed and compared to appropriate reaction thresholds.

FIG. 5D illustrates an example of a variant 516 of threat 502 that would result in a false negative if only straight signature matching were used but can be detected if the proximity of variant 516 to signature 504 is computed and compared to appropriate reaction thresholds. The first mismatch between variant 516 and signature 504 occurs with portion 518 of variant 516. That is, instead of "GET" in the corresponding portion 506 of signature 504, a protocol equivalent "HEAD" is present in portion 518 of variant 516. In terms of HTTP processing, however, the command word "HEAD" may have the same or a similar effect as "GET". Even though portion 518 of variant 516 causes a mismatch to occur, further matching between variant 516 and signature 504 is not ceased, and a mismatch score is computed for portion 518 of variant 516. The mismatch score may be computed in various manners. For example, each literal byte of mismatch may be at least initially assigned a constant, such as 1. Thus, if each literal byte of mismatch is assigned a score of 1, in the given example, portion 518 would result in a mismatch score of 4. However, if some protocol or regular expression language knowledge is available, e.g., if it can be deduced that in the given context "HEAD" and "GET" are interchangeable, it is possible to weight the mismatch score associated with portion 518 by a multiplier that takes this knowledge or awareness into account. For instance, the mismatch score of 4 may be weighted by a multiplier, 0.5, resulting in a weighted mismatch score of 2 (0.5*4) for portion 518 of variant 516.

The next consecutive portion of variant 516, portion 520, matches the corresponding portion of signature 504. If the metric used to compute a proximity score is based at least in part on the number of bytes of a signature that match and the number of bytes of a signature that mismatch, it is also desirable to calculate an appropriate match score or weighted match score for portions that match. For example, if each literal byte that matches is assigned a score of 1, portion 520 of variant 516 results in a match score of 18. In some embodiments, the part of portion 520 that matches the wildcard portion 508 of signature 504 is weighted less than other matching bytes.

Portion 522 of variant 516 fails to match the corresponding portion 510 of signature 504. Portion 510 of signature 504 requires an alphabetic character that is repeated at least six times. However, in the corresponding position in variant 516, a numeric character ("2") is repeated eight times. Thus, there exists a literal mismatch of 8 bytes between variant 516 and signature 504 at this position. If each literal byte of mismatch is assigned a score of 1, a mismatch score of 8 is associated with portion 522. However, if some knowledge of the associated protocol and/or pattern language exists, the nature of the mismatch can again be evaluated to some degree, and an appropriate weight may be determined and applied to the mismatch score of portion 522. Portion 522 of variant 516 meets the length criteria of portion 510 of signature 504 since in portion 522 the same character is repeated at least six times. The mismatch is a result of a character range mismatch. That is, the number "2" is not included in the character range "[A-Z]" defined in portion 510. However, the repetition of the same number (e.g., "2") at portion 522 may have the same or a similar effect as an alphabetic character. An alphanumeric range may not have originally been specified in signature 504 at portion 510 so as not to further increase the possibilities of false positives. Since a simple range mismatch (i.e. a "2" instead of a character from the range "A-Z") may be construed as a less significant mismatch than a literal byte mismatch (e.g., if different alphanumeric characters appeared at portion 522 such as "2E9KCX3M"), an appropriate weight may be applied to the mismatch score computed for portion 522. For instance, the mismatch score of 8 may be weighted by a multiplier, 0.125, resulting in a weighted mismatch score of 1 (0.125*8) for portion 522 of variant 516.

Any appropriate combination of one or more heuristics may be employed to determine the proximity score of variant 516 with respect to signature 504. For example, the proximity score may be based at least in part on the ratio of the cumulative match scores and the cumulative mismatch scores and may be compared to one or more reaction thresholds associated with the heuristic(s). For a proximity score based on the ratio of matched to mismatched bytes, a higher proximity score indicates a closer match. Depending on the network security policy, various reaction thresholds may be specified. For example, an alert threshold of 3 and a blocking threshold of 4 may be specified. That is, if the proximity score exceeds 3 an alert to an administrator is issued and if the proximity score exceeds 4 the associated network flow is additionally blocked. For variant 516, the ratio of the cumulative match score (18) and the cumulative weighted mismatch score (2+1=3) results in a proximity score of 6 (i.e. 18/3). For the given example, an alert is issued and the associated network traffic is blocked.

Figure 5E:
FIG. 5E illustrates an example of a legitimate network flow that bears some similarity to but is not in this example a variant of the threat of FIG. 5A.

FIG. 5E illustrates an example of a legitimate network flow 524 that bears some similarity to but is not in this example a variant of threat 502. Portion 526 of flow 524 matches the corresponding portion of signature 504. If each literal byte that matches is assigned a score of 1, portion 526 results in a match score of 16. Portion 528 of flow 524 fails to match the corresponding portion of signature 504. If each literal byte of mismatch is also assigned a score of 1, a mismatch score of 11 is associated with portion 528. For a proximity score based on the ratio of matched to mismatched bytes, flow 524 results in a proximity score of 1.45 (16/11), which does not meet either of the exemplary reaction thresholds (3 or 4) given above. Thus, flow 524 is not detected as a potentially malicious variant of threat 502. By appropriately adjusting the reaction thresholds, it is possible not to detect certain network flows that may be legitimate, e.g., the example of FIG. 5E may correspond to a normal CGI action. However, if a tighter security policy is desired, the reaction thresholds can be adjusted such that network flows such as that of FIG. 5E are detected. The reaction thresholds selected for a local security policy may depend on various factors, such as availability of resources, tolerance for false positives and negatives, etc.

As described herein, by measuring how close of a match a piece of network traffic is to a signature associated with a known threat, it is possible to detect a variant of the known threat in real-time without having a priori knowledge of the specific variant and while still maintaining low false positive and false negative rates. Thus, instead of disregarding a close match, the proximity of such a match is computed and an appropriate security response is triggered depending on the extent of the match to prevent a malicious variant from infiltrating a secured network.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for detecting a variant of a known threat comprising:
    electronically identifying on a network, using at least one processor, a portion of network traffic similar to at least a portion of a signature associated with the known threat, the known threat indicating an attempted network intrusion;
    determining an extent of match between the portion of network traffic and the at least a portion of the signature, wherein each portion of the signature is assigned a weight for a possible occurrence of a match between the portion of network traffic and the at least a portion of the signature, wherein at least one combination of portions of the signature is assigned a weight multiplier based upon a possible nature of a match between the portion of network traffic and the at least a portion of the signature, wherein the extent of match comprises a cumulative score that is calculated based upon one or more scores associated with the weights of one or more signature portions and one or more scores associated with the weights of one or more combinations of signature portions that are multiplied by one or more of the weight multipliers;
    determining that the extent of match satisfies a threshold; and
    triggering an electronic security response based at least in part on the determination that the extent of match satisfies the threshold;
    wherein the portion of network traffic being matched with the at least a portion of the signature does not exactly match the at least a portion of the signature.

2. The method as recited in claim 1, wherein determining the extent of match includes determining a number of bytes that match.

3. The method as recited in claim 1, wherein determining the extent of match includes determining a number of bytes that mismatch.

4. The method as recited in claim 1, wherein the extent of match is based at least in part on one or more of a running sum of a number of bytes that match and a running sum of a number of bytes that mismatch.

5. The method as recited in claim 1, wherein determining the extent of match includes:
    determining a number of bytes that match and a number of bytes that mismatch; and
    applying at least one heuristic to the number of bytes that match and the number of bytes that mismatch.

6. The method as recited in claim 5, wherein the heuristic comprises a ratio of the number of bytes that match to the number of bytes that mismatch.

7. The method as recited in claim 5, wherein the threshold is based on the at least one heuristic.

8. The method as recited in claim 1, wherein the threshold is based at least in part on one or more of a number of bytes that match, a number of bytes that mismatch, a percentage of match, and a percentage of mismatch.

9. The method as recited in claim 1, further including parsing the signature into segments and wherein the threshold is based at least in part on one or more of a number of segments that match and a number of segments that mismatch.

10. The method as recited in claim 1, wherein the threshold is a first threshold and further including:
    determining an extent of mismatch;
    determining that the extent of mismatch satisfies a second threshold; and
    concluding, based at least in part on the determination that the extent of mismatch satisfies the second threshold, that processing with respect to the signature should be discontinued.

11. The method as recited in claim 10, wherein the second threshold is based at least in part on one or more of a number of bytes that mismatch and a percentage of mismatch.

12. The method as recited in claim 10, further including parsing the signature into segments and wherein the second threshold is based at least in part on a number of segments that mismatch.

13. The method as recited in claim 1, wherein the security response comprises one or more of blocking the portion of network traffic, alerting an administrator, and logging the portion of network traffic.

14. A system for detecting a variant of a known threat comprising:
a processor configured to:
electronically identify on a network a portion of network traffic similar to at least a portion of a signature associated with the known threat, the known threat indicating an attempted network intrusion;
determine an extent of match between the portion of network traffic and the at least a portion of the signature, wherein each portion of the signature is assigned a weight for a possible occurrence of a match between the portion of network traffic and the at least a portion of the signature, wherein at least one combination of portions of the signature is assigned a weight multiplier based upon a possible nature of a match between the portion of network traffic and the at least a portion of the signature, wherein the extent of match comprises a cumulative score that is calculated based upon one or more scores associated with the weights of one or more signature portions and one or more scores associated with the weights of one or more combinations of signature portions that are multiplied by one or more of the weight multipliers;
determine that the extent of match satisfies a threshold; and
trigger a security response based at least in part on the determination that the extent of match satisfies the threshold;
wherein the portion of network traffic being matched with the at least a portion of the signature does not exactly match the at least a portion of the signature; and
a communication interface coupled to the processor and configured to receive the portion of network traffic.

15. The system as recited in claim 14, further comprising a memory coupled with the processor wherein the memory provides the processor with instructions.

16. The system as recited in claim 14 wherein the processor is configured to determine the extent of match at least in part by:
determining a number of bytes that match and a number of bytes that mismatch; and
applying at least one heuristic to the number of bytes that match and the number of bytes that mismatch.

17. A computer program product for detecting a variant of a known threat, the computer program product being embodied in a non-transitory computer readable medium and comprising computer instructions for:
electronically identifying on a network, using at least one processor, a portion of network traffic similar to at least a portion of a signature associated with the known threat, the known threat indicating an attempted network intrusion;
determining an extent of match between the portion of network traffic and the at least a portion of the signature, wherein each portion of the signature is assigned a weight for a possible occurrence of a match between the portion of network traffic and the at least a portion of the signature, wherein at least one combination of portions of the signature is assigned a weight multiplier based upon a possible nature of a match between the portion of network traffic and the at least a portion of the signature, wherein the extent of match comprises a cumulative score that is calculated based upon one or more scores associated with the weights of one or more signature portions and one or more scores associated with the weights of one or more combinations of signature portions that are multiplied by one or more of the weight multipliers;
determining that the extent of match satisfies a threshold; and
triggering a security response based at least in part on the determination that the extent of match satisfies the threshold;
wherein the portion of network traffic being matched with the at least a portion of the signature does not exactly match the at least a portion of the signature.

18. A system for detecting a variant of a known threat comprising:
means for electronically identifying, using at least one processor, on a network, a portion of network traffic similar to at least a portion of a signature associated with the known threat, the known threat indicating an attempted network intrusion;
means for determining an extent of match between the portion of network traffic and the at least a portion of the signature, wherein each portion of the signature is assigned a weight for a possible occurrence of a match between the portion of network traffic and the at least a portion of the signature, wherein at least one combination of portions of the signature is assigned a weight multiplier based upon a possible nature of a match between the portion of network traffic and the at least a portion of the signature, wherein the extent of match comprises a cumulative score that is calculated based upon one or more scores associated with the weights of one or more signature portions and one or more scores associated with the weights of one or more combinations of signature portions that are multiplied by one or more of the weight multipliers;
means for determining that the extent of match satisfies a threshold; and
means for triggering a security response based at least in part on the determination that the extent of match satisfies the threshold;
wherein the portion of network traffic being matched with the at least a portion of the signature does not exactly match the at least a portion of the signature.

19. The method as recited in claim 2, further including multiplying at least one byte that matched by an assigned weight multiplier.

20. The method as recited in claim 3, further including multiplying at least one byte that mismatched by an assigned weight multiplier.

* * * * *